(12) United States Patent
Willacker et al.

(10) Patent No.: US 10,992,196 B2
(45) Date of Patent: Apr. 27, 2021

(54) STATOR FOR AN ELECTRICAL MACHINE HAVING AN INTERCONNECTION DEVICE FOR STATOR COILS, AND ELECTRICAL MACHINE HAVING SUCH A STATOR

(71) Applicant: ZF FRIEDRICHSHAFEN AG, Friedrichshafen (DE)

(72) Inventors: Katja Willacker, Wiesentheid (DE); Roland Lindwurm, Sennfeld (DE); Christoph Wieder, Küps (DE); Jochen Wittmann, Burkardroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 49 days.

(21) Appl. No.: 16/305,830

(22) PCT Filed: Apr. 27, 2017

(86) PCT No.: PCT/EP2017/060005
§ 371 (c)(1),
(2) Date: Nov. 29, 2018

(87) PCT Pub. No.: WO2017/207183
PCT Pub. Date: Dec. 7, 2017

(65) Prior Publication Data
US 2019/0181710 A1 Jun. 13, 2019

(30) Foreign Application Priority Data
Jun. 1, 2016 (DE) .......................... 102016209523.4

(51) Int. Cl.
*H02K 3/12* (2006.01)
*H02K 3/52* (2006.01)
(Continued)

(52) U.S. Cl.
CPC ................. *H02K 3/12* (2013.01); *H02K 1/16* (2013.01); *H02K 3/48* (2013.01); *H02K 3/522* (2013.01); *H02K 5/00* (2013.01); *H02K 2203/09* (2013.01)

(58) Field of Classification Search
CPC .. H02K 3/00; H02K 3/26; H02K 3/28; H02K 3/32; H02K 3/38; H02K 3/46; H02K 3/50;
(Continued)

(56) References Cited

U.S. PATENT DOCUMENTS

2003/0201688 A1* 10/2003 Yamamura ............... H02K 3/50
310/71
2005/0023910 A1* 2/2005 Lukenich ............... H02K 3/522
310/71
(Continued)

FOREIGN PATENT DOCUMENTS

DE 20 2010 014 425 2/2011
EP 1 184 957 3/2002
(Continued)

*Primary Examiner* — Tran N Nguyen
(74) *Attorney, Agent, or Firm* — Cozen O'Connor (57) ABSTRACT

A stator of an electric machine has an annular stator lamination stack at which stator coils with coil ends are arranged by winding bodies and are connected to an interconnection device arranged at the stator lamination stack on the front side. The interconnection device (38) is fixed to the stator coils by a carrier element and has connection conductors arranged coaxial to one another that are electrically insulated from one another by insulating layers and carried by the carrier element. Coil connection areas and power connection areas are provided at the connection conductors. The carrier element is formed by one of the connection conductors and/or by a disk-shaped insulating layer and that the connection conductors and the further insulating layers are fixed to the carrier element.

8 Claims, 5 Drawing Sheets

(51) Int. Cl.
*H02K 1/16* (2006.01)
*H02K 3/48* (2006.01)
*H02K 5/00* (2006.01)

(58) Field of Classification Search
CPC ............ H02K 3/52; H02K 3/522; H02K 5/00;
H02K 5/22; H02K 5/225; H02K 7/00;
H02K 7/08; H02K 7/083; H02K 11/00;
H02K 11/20; H02K 11/21; H02K 11/215;
H02K 15/00; H02K 15/0056; H02K
15/0062; H02K 15/02; H02K 15/03;
H02K 15/10; H02K 15/12; H02K 29/00;
H02K 29/08; H01R 25/00; H01R 25/16;
H01R 25/161; H01R 25/168; H01R
43/00; H01R 43/16
See application file for complete search history.

(56) References Cited

U.S. PATENT DOCUMENTS

| | | | |
|---|---|---|---|
| 2008/0242124 A1* | 10/2008 | Otsuji | ................. H01R 25/168 439/76.2 |
| 2010/0156208 A1 | 6/2010 | Schaeflein et al. | |
| 2013/0106250 A1 | 5/2013 | Kanada et al. | |
| 2014/0009028 A1* | 1/2014 | Shijo | ........................ H02K 3/46 310/180 |
| 2014/0015359 A1 | 1/2014 | Chamberlin et al. | |
| 2015/0008775 A1 | 1/2015 | Aria | |

FOREIGN PATENT DOCUMENTS

| | | | | |
|---|---|---|---|---|
| EP | 1 505 711 | | 2/2005 | |
| EP | 2 874 277 | | 3/2015 | |
| JP | 2003-134759 | | 5/2003 | |
| JP | 2005065374 | * | 3/2005 | ............... H02K 3/18 |

* cited by examiner

STATOR FOR AN ELECTRICAL MACHINE HAVING AN INTERCONNECTION DEVICE FOR STATOR COILS, AND ELECTRICAL MACHINE HAVING SUCH A STATOR

CROSS REFERENCE TO RELATED APPLICATIONS

This is a U.S. national stage of application No. PCT/EP2017/060005, filed on Apr. 27, 2017. Priority is claimed on German Application No. DE102016209523.4, filed Jun. 1, 2016, the content of which is incorporated here by reference.

BACKGROUND OF THE INVENTION

Field of the Invention

The present invention is directed to a stator of an electric machine with an interconnection device for stator coils and to an electric machine having a stator of this kind.

2. DESCRIPTION OF THE PRIOR ART

In a generic stator known from EP 1 184 957 B1, an interconnection device comprising a plurality of concentric, axially staggered connection conductors is arranged axially adjacent to stator coils and is fastened to winding bodies of these stator coils by a connection holder serving as carrier element. The connection conductors are insulated from one another in a trough-shaped carrier element by insulating layers. The coil ends in this arrangement exit axially from the coils and are connected to connection areas that protrude from the connection conductors and are guided out at a radially outer circumferential area of the interconnection device.

SUMMARY OF THE INVENTION

It is an object of one aspect of the invention to provide a stator of an electric machine of the type indicated above and an electric machine with an interconnection device for the stator coils that economizes on installation space and is inexpensive.

Advantageous configurations and further developments of the invention can be discerned from the dependent claims and from the description of the figures.

Accordingly, a proposed stator of an electric machine has an annular stator lamination stack at which a quantity of stator coils with coil ends is arranged by winding bodies, and the coil ends are connected to an interconnection device arranged on the front side of the stator lamination stack. The interconnection device is fixed to the stator coils by a carrier element and has a plurality of connection conductors arranged coaxial to one another, are electrically insulated from one another by a plurality of insulating layers and are carried by the carrier element. Coil connection areas for the coil ends and power connection areas for the power supply of the electric machine are provided at the connection conductors.

The proposed stator is characterized in particular in that the carrier element is formed by one of the connection conductors and/or by a disk-shaped insulating layer, and in that the further connection conductors and the further insulating layers are fixed to the carrier element. In other words, the carrier element can be formed by a connection conductor or by an insulating layer and an insulating layer, particularly an insulating layer adjacent to this carrier element formed by the connection conductor or by the insulating layer.

In this regard, an insulating layer functioning as a carrier element does not simultaneously form the two outer insulating layers of the interconnection device as is the case in a trough-shaped carrier element for the connection conductors, which is known from the prior art. Accordingly, an insulating layer serving as carrier element is in abutting contact with only one connection conductor or with two adjacent connection conductors. The connection conductors and insulating layers that do not serve as the carrier element can be dimensioned smaller than the carrier element, i.e., in particular can have a smaller radial extension. Costs and installation space can be economized by dispensing with a separate carrier element.

The insulating layers can be provided as separate insulating disks or as coating sprayed onto one or both sides of a connection conductor. Particularly in the case of a sprayed-on coating, at least only the coil connection areas and the power connection areas can be exposed. If necessary to increase dielectric strength, this coating can also enclose an inner or outer circumferential surface of a connection conductor. When the carrier element is provided by an insulating layer, at least this insulating layer is capable of supporting a load and can advantageously be produced from a suitable plastic. Alternatively, the further insulating layers can be carried out with a lower material strength than the carrier element and can also be made from another insulating material, for example, a paper or a foil, particularly a self-adhesive foil. The mutual connection of the insulating layers and connection conductors and the connection to the carrier element can be carried out through separate connections or through connections that are formed integrally, particularly integral with the insulating layers. To this end, plastic pins protruding axially from the disk surface, for example, can be formed at least at any insulating layer, and the connection conductors and further insulating layers can be attached to these plastic pins by receiving openings provided thereon. Alternatively, separate plastic pins, studs, rivets, etc. can be used. The arrangement can be secured axially, for example, through ultrasonic welding or by heat staking of the plastic pins. A connection conductor and an insulating layer, or all of the connection conductors and the insulating layers arranged therebetween and possibly on the outer side, can form a common pre-manufactured element in this way. For purposes of mutual centering of the insulating layers and connection conductors, the inner/outer circumferential areas of these elements in particular can be formed to enable a mutual positive engagement.

In particular, when an electric machine is operated at a low voltage, which does not exceed the limiting values for voltage range I as per IEC 60499 and for which the limiting value for alternating voltage is less than or equal to 50V, at least one or both outer insulating layer(s) can be dispensed with in the arrangement of connection conductors. This means that for a delta connection with three connection conductors, only two insulating layers located between the connection conductors can be sufficient instead of the usual four insulating layers.

According to an advantageous embodiment of the invention, an insulating layer located between two connection conductors can also serve as a carrier element of the interconnection device instead of an outer insulating layer. The connection conductors located on both sides of the carrier element can accordingly be adapted to the stator or fitted into existing smaller installation spaces inside a housing of the electric machine, which results in an overall compact arrangement of the stator.

In a particularly advantageous manner, the connection conductors and the insulating layers can have the shape of an annular disk and can be arranged so as to be axially staggered at the stator or relative to the stator. A plurality of carryover parts can be used for the connection conductors and insulating layers owing to the identical diameters. Alternatively, the connection conductors and the insulating layers can also be ring-shaped and arranged in a radially staggered manner at the stator or relative to the stator.

Depending on the specific installation space conditions, the carrier element of the interconnection device can be fastened directly to the winding bodies or also to a stator carrier or to an element fixedly connected to the stator carrier, for example, a housing.

According to an embodiment which is advantageous in technical respects relating to manufacture, a winding body can have a winding area formed by a winding carrier and by two legs that limit the winding area in axial direction and are connected to the winding carrier, and the connection conductors are arranged axial to the winding area or radial to the winding area. The carrier element can be fastened at least to one of the above-mentioned legs or to both legs. The winding bodies are typically fabricated from a plastic, particularly an injection-moldable plastic, so that corresponding holding areas in the form of holding clamps, snap-in connections, recesses, projections, etc. can easily be formed at the legs. For example, pins protruding in axial direction from the winding body can serve as holding areas for cooperating with the carrier element. The interconnection device can be placed with its carrier element on these pins which are permanently and captively held by a subsequent thermal deformation.

Further, the interconnection device can advantageously be arranged axially adjacent to the winding area of the stator coils. One or more connection conductors can at least partially extend into the winding area or be received by the latter.

According to advantageous further developments of the invention, the coil ends can be guided radially out of the winding bodies and can be arranged axially directly adjacent to the coil connection areas. The coil ends can be located on the same axial side as the winding areas with reference to the coil connection areas. Accordingly, it is unnecessary to guide the coil ends through the interconnection device or to cross the coil ends over the connection conductors, which considerably simplifies assembly of the arrangement.

In a further aspect, the present invention is directed to an electric machine with a rotor and with a stator, wherein the stator has at least one of the above-mentioned features.

BRIEF DESCRIPTION OF THE DRAWINGS

The invention will be described in the following by way of example referring to an embodiment form shown in the figures.

The drawings show.

DETAILED DESCRIPTION

Like objects, functional units or comparable components are designated throughout the figures by like reference numerals. Further, summarizing reference numerals are used for components and objects that occur more than once in an embodiment example or in a drawing but which are collectively described with respect to one or more features. Components or objects designated by the same or summarizing reference numerals may be implemented alike but possibly also differently with respect to individual, several or all features, e.g., their dimensioning, insofar as the description does not explicitly or implicitly indicate otherwise. In order to avoid repetition, identical objects, functional units or comparable components in various embodiment examples are not described repeatedly, and only distinctions between embodiment examples are described.

Figure 1:
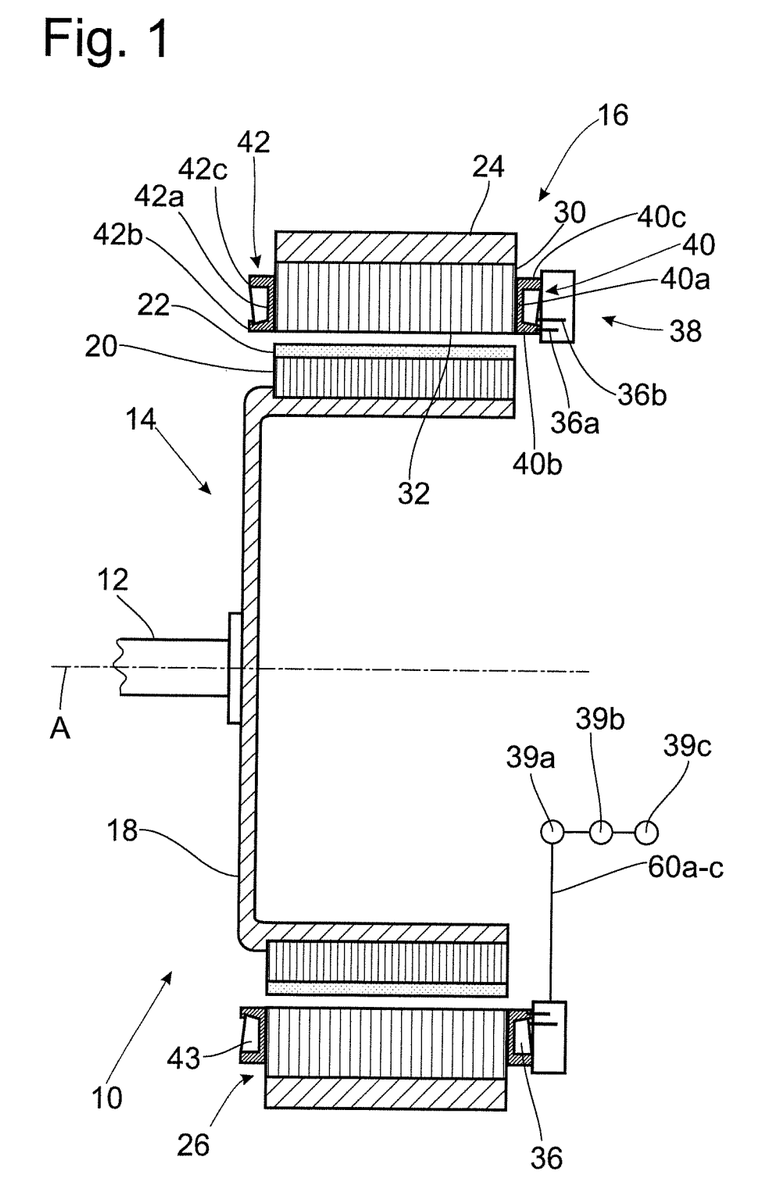
FIG. 1 is a schematic view of an electric machine with a stator and an interconnection device.

FIG. 1 schematically shows an electric machine 10, more accurately a permanently excited inrunner-type electric synchronous machine, having a rotor 14 that is rotatable around a rotor shaft 12 with a rotational axis A and having a stator 16 that radially outwardly surrounds the rotor 14. Rotor 14 comprises a pot-shaped rotor carrier 18. A rotor lamination stack 20 that carries a plurality of permanent magnets 22, which are spaced apart from one another at the circumference, is arranged on the cylindrical outer circumferential surface of the rotor carrier 18.

Stator 16 comprises an annular stator carrier 24. An annular stator lamination stack 26 which is likewise formed of sheet metal laminates is arranged in the central recess of the stator carrier 24. Accordingly, the rotational axis A forms the center axis A of the stator at the same time. The stator carrier 24 can be an outer housing or an intermediate housing of the electric machine 10, for example.

Stator lamination stack 26 comprises an annular stator yoke 30 contacting the stator carrier 24 and teeth 32 protruding radially inward from the latter and outfitted with a plurality of stator coils 36 to form a stator winding. These stator coils 36 are wound from a copper wire around teeth 32 by two insulating or winding bodies 40, 42 made of a heat-resistant plastic and are secured against slippage at the teeth 32. The winding bodies 40, 42 comprise in each instance a base region or winding carrier 40a; 42a contacting the lamination stack 26 at the front side and two legs 40b, c; 42b, c, which protrude axially at the stator 16 approximately at right angles from the winding carrier 40a; 42a and which limit a winding area 43 in radial direction.

The coils 36 are associated with electrically discrete strands, for which purpose the coil ends 36a, b are connected to one another in a predetermined manner by an interconnection device 38, shown only schematically as a block in FIG. 1, which axially adjoins the winding areas 43 of coils 36.

Figure 2A:
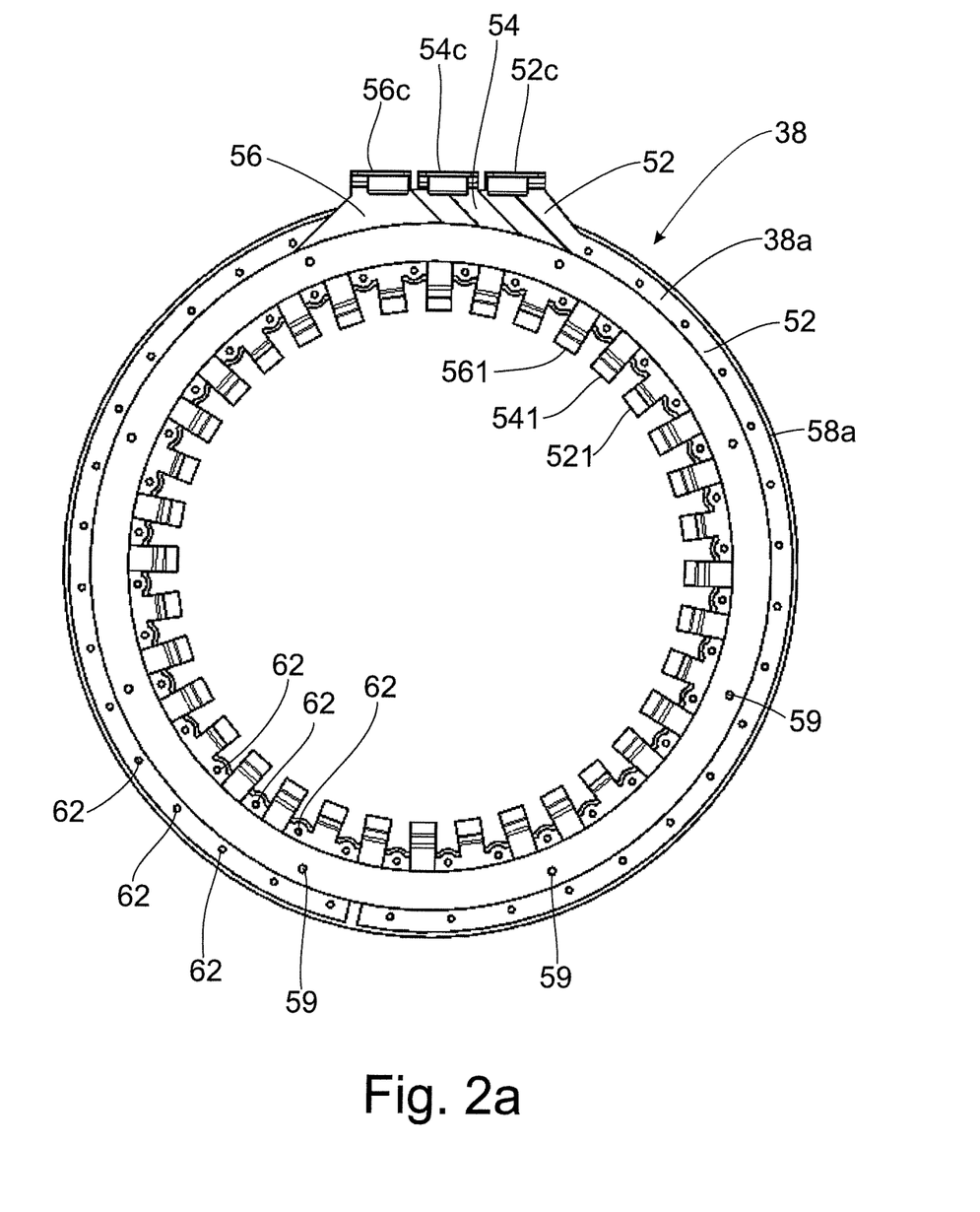
FIGS. 2a-c are an interconnection device with a carrier element comprising an insulating layer and a connection conductor adjacent thereto in several views for arranging at the stator shown in FIG. 1.
Figure 2B:
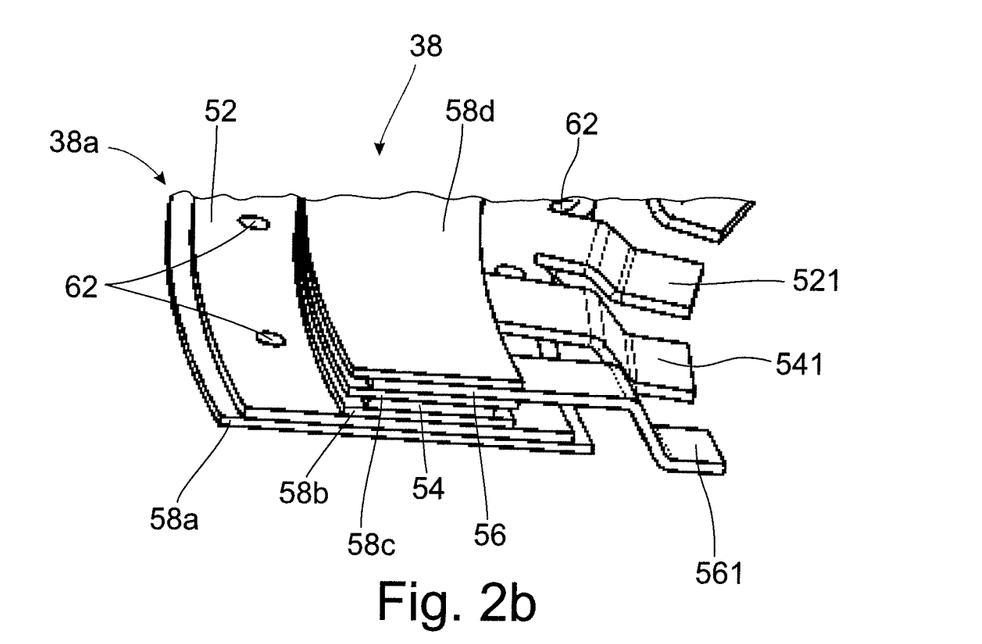
Figure 2C:
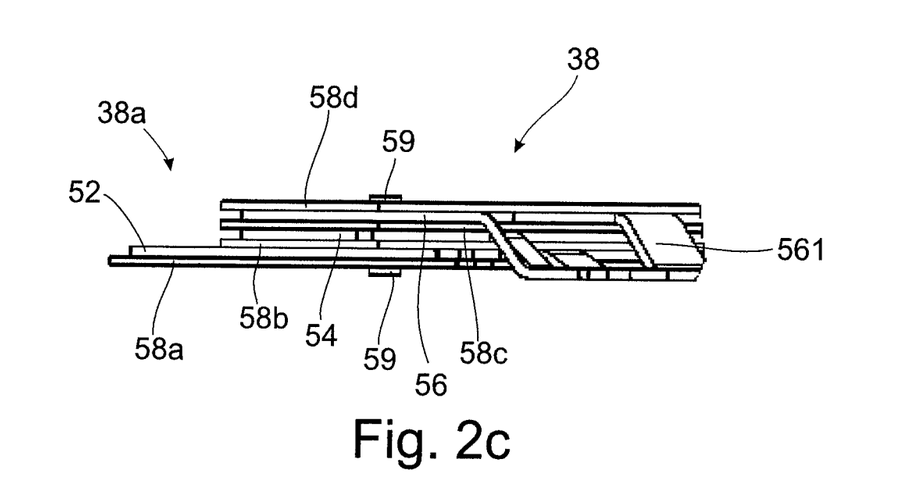
Figure 3:
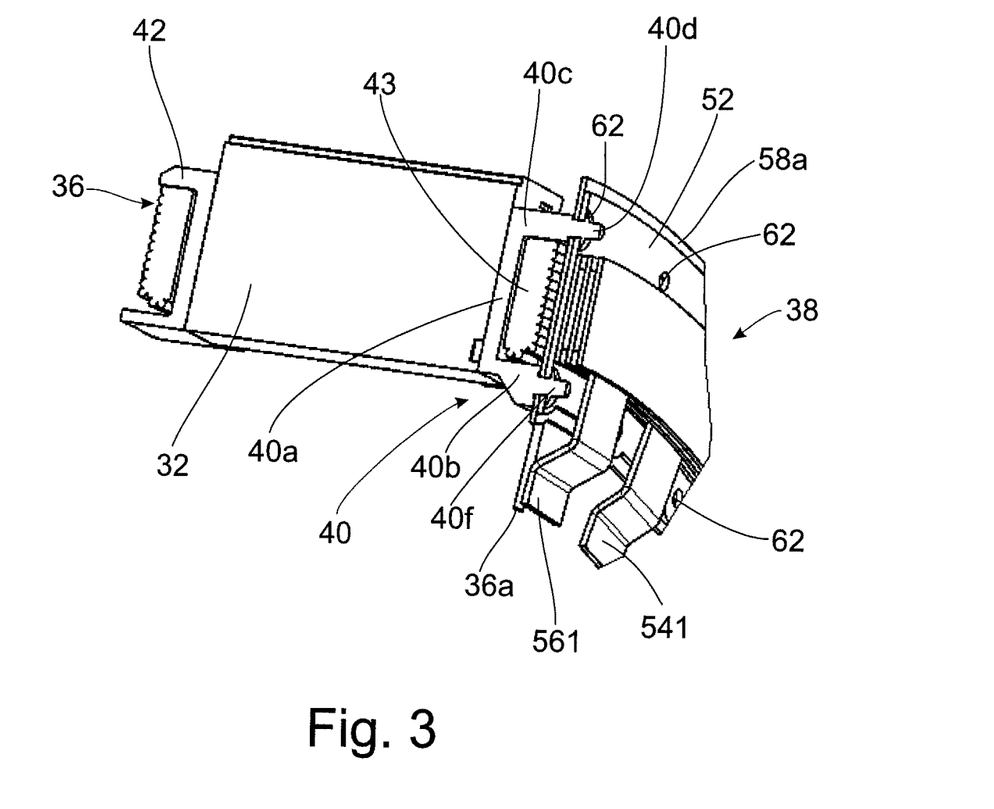
FIG. 3 is a perspective partial axial section of a stator with an interconnection device according to FIG. 2 which is fixed at winding bodies of stator coils.

To this end, as can be seen from the further FIGS. 2-3, the interconnection device 38 comprises—in the present case—three connection conductors 52, 54, 56 that are insulated from one another by insulating layers 58a-d and which have coil connection areas 521, 541, 561 spaced apart along the circumference for contacting the coil ends 36a, b.

The interconnection device 38 is fastened to the winding bodies 40 by a carrier element 38a as can be seen and as will be described in more detail referring to the further figures. In the embodiment example under discussion, the carrier element 38a is formed by the connection conductor 52 nearest the winding areas 43 and by a disk-shaped insulating layer 58a, which contacts connection conductor 52 and faces winding areas 43. The further connection conductors 54, 56 and the further insulating layers 58b-d are fixed to the carrier element 38a by connection elements 59 as will be described more fully by way of example in the following referring to 4.

Further, the interconnection device 38 is connected (FIG. 1) to an electric power source 39c via power connection areas 52c, 54c, 56c (FIG. 2a) provided radially outwardly at the connection conductors 52, 54, 56 and by terminal leads 60a-c or, alternatively, is connected directly to power electronics 39a and control electronics 39b. This electric power source 39c can apply current of variable phase and amplitude to the winding for operating the electric machine 10. The power connection areas 52c, 54c, 56c are constructed as lugs protruding out of the viewing plane. FIG. 2a shows only the associated insulating layers 58.

In the present case, the connection conductors 52-56 are produced as annular disks from a semifinished copper product, in particular a copper plate or copper sheet, by a stamping process or the like. These annular disks are arranged at the stator 16 coaxial to the center axis A and stacked axially with respect to one another with insulating layers 58a-d therebetween, including two further insulating layers covering the end faces or plane surfaces.

The coil connection areas 521, 541, 561 are formed as inner radial extensions at the annular disk-shaped connection conductors 52, 54, 56 and are offset axially in direction of the coils 36 so that they are ready to be connected to the coil ends 36a, b in a common plane. In FIG. 3, in contrast to the schematic view in FIG. 1, the coil ends 36a, b are guided out of the winding bodies 40 radially rather than axially so that they are arranged directly axially adjacent to the coil connection areas 521, 541, 561 and can contact the latter. Coil ends 36a, b are located on the same axial side as the winding areas 43 with reference to the coil connection areas 521, 541, 561. Accordingly, it is unnecessary to guide the coil ends 36a, b through the interconnection device 38 or to cross the coil ends 36a, b over the connection conductors 52, 54, 56. During assembly of the stator, the interconnection device 38 in this embodiment example is arranged at the stator and fixed to the stator, while the coil ends 36a, b are ready to make contact with the coil connection areas 521, 541; 561, and essentially no further deformation or change in position of either the coil connection areas 521, 541; 561 or coil ends 36a, b is required. In FIG. 3, the above-mentioned arrangement is shown by way of example at a coil end 36a. The coil connection areas 521, 541; 561 and the coil ends 36a, b accordingly protrude radially inward over the stator teeth 32 and are arranged axially adjacent to the rotor 14 with reference to the general layout of the electric machine 10 according to FIG. 1.

In the embodiment example shown here, the interconnection of the coil ends 36a, b is carried out with three connection conductors 52, 54, 56 for implementing a delta connection. Inner insulating layers 58b, c and front outer insulating layers 58a, d are provided between the three connection conductors 52, 54, 56 but may be dispensed with if the electric machine is operated at low voltage.

Like the connection conductors 52, 54, 56, the insulating layers are formed in FIGS. 2-4 as individual flat annular disks. Alternatively, in order to form an insulating layer 58 the connection conductors 52-56 can also be coated or injection molded with a plastic that covers both end faces and the radially inner and outer circumferential surface of a connection conductor 52-56. The radial extension of an insulating layer 58 can correspond approximately to the radial extension of an associated connection conductor 52-56. Under certain conditions, electric voltage breakdown and, therefore, unwanted short circuits can occur at the radially inner or radially outer edge areas of the connection conductors 52-56. In order to increase the dielectric strength, a clearance distance and creepage distance of the connection conductors 52-56, which are at a different electric potential, can be increased in that an insulating layer 58, which is associated with a connection conductor 52-56, extends beyond a radially inner and/or radially outer edge area and, accordingly, extends past the connection section conductor 52-56 as can be seen from FIGS. 2, 3. The length to which an insulating layer 58 extends past depends on the layout of the electric machine 10 and on the required clearance distance and creepage distance and, for a stator of an electric drive motor, for example, may amount to about 0.5 mm to about 5 mm, preferably about 2 mm to 3 mm.

In the embodiment example under discussion referring to FIG. 3, a plurality of overlapping shared fastening portions 62 in the form of recesses which are distributed in circumferential direction are provided at the connection conductor 52 and at the insulating layer 58a for fixing to the two legs 40b, c of the winding bodies 40. In conformity with this circumferential distribution, receiving portions 40d, fin the form of axially protruding pins are formed at the legs 40b, c and receive the interconnection device 38 and fix it in the occupied position by subsequent heat staking. The connection conductors 52-56 are accordingly arranged axially with respect to a winding area 43 in the figures.

Figure 4A:
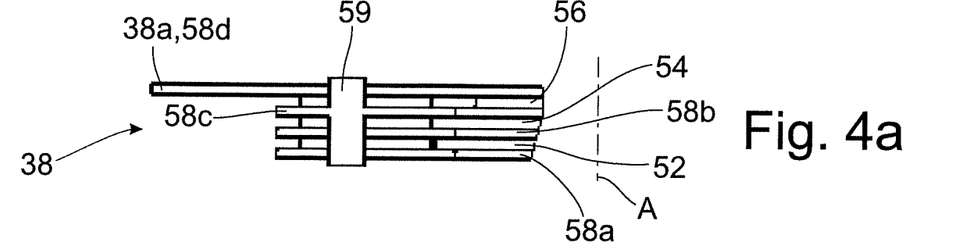
FIGS. 4a-e are several exemplary variants of in interconnection device with a carrier element.
Figure 4B:
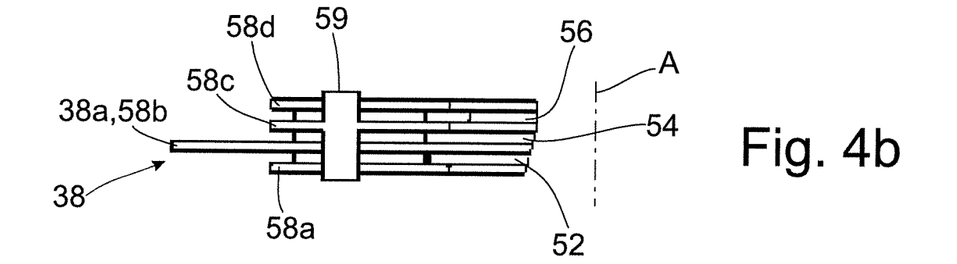
Figure 4C:
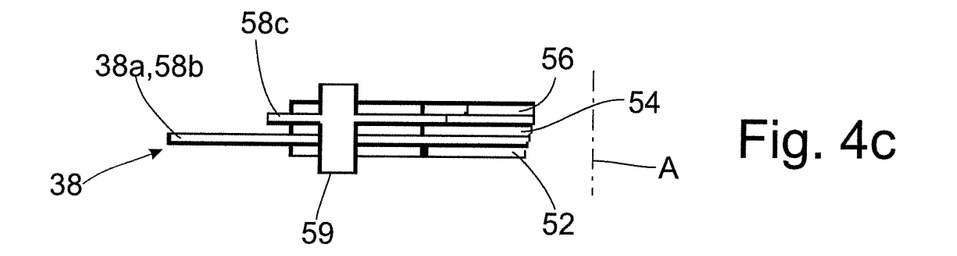
Figure 4D:
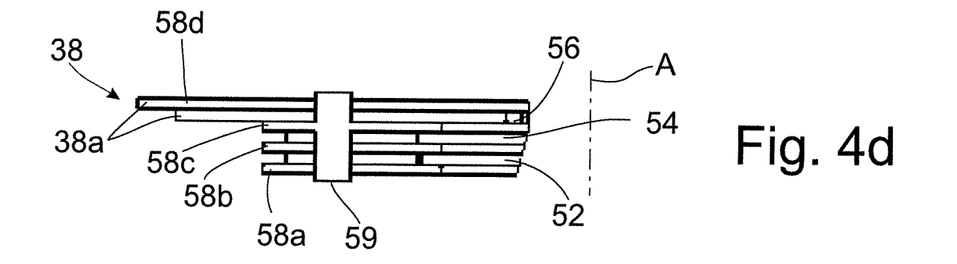
Figure 4E:
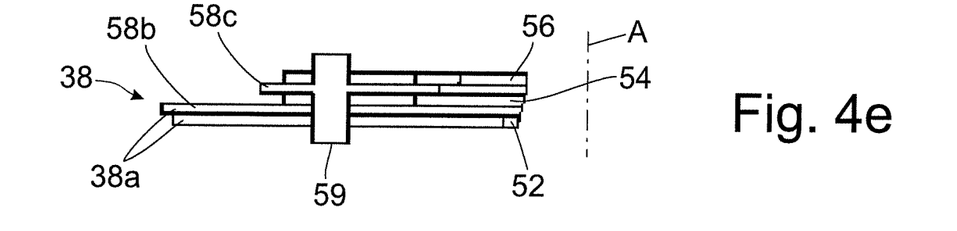

FIGS. 4a-e show several exemplary arrangement variants of an interconnection device 38 with a carrier element 38a, which has a greater radial extension than that of the rest of the elements. However, this is in no way compulsory. In all of the variants, there are three connection conductors 53-56 received and fixed in position by a plurality of connection elements 59, which are provided in this instance at the insulating layer 58c fashioned as plastics part and are formed at the latter as axial pins. Four insulating layers 58 are provided in FIG. 4a, the outer insulating layer 58d being formed as a carrier element 38a. According to the view in FIG. 4b, an insulating layer 58b located between two connection conductors can also serve as carrier element 38a of the interconnection device 38. In contrast to FIG. 4b, only two inner insulating layers 58b, c are provided in FIG. 4c, but the outer insulating layers 58a, d are dispensed with. In FIG. 4d, the outer insulating layer 58d and the connection conductor 56 jointly form the carrier element 38, which basically corresponds to the arrangement shown in FIGS. 2, 3, although in a mirror inverted manner. Finally, a basically identical arrangement is shown in FIG. 4e in which the outer insulating layers 58a, d are omitted.

By way of addition, the connection conductors 52-56 and also the contacting insulating layers 58 can be constructed with an electrical conductor cross section which narrows in diameter proceeding from the power connection areas in circumferential direction to the coil connection areas in order to further economize on material.

To protect the mutual contact points of the coil connection areas and coil ends, the stator of the electric machine can be provided with a coating, for example, a powder coating, a lacquer coating or with a silicone coating, at least in the region of the interconnection device.

Of course, the subject matter of the invention is not limited to stators of permanently excited electric machines, but can be transferred to other types of electric machines and stators thereof going beyond the embodiment examples mentioned herein.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A stator of an electric machine comprising:
    a quantity of stator coils with coil ends;
    winding bodies;
    an annular stator lamination stack at which the quantity of stator coils is arranged by the winding bodies; and
    an interconnection device for the stator coils arranged at the stator lamination stack on a front side, wherein the interconnection device is fixed to the winding bodies of the stator coils by a carrier element of the interconnection device, the interconnection device comprises:
        the carrier element having a first radial extension;
        a plurality of separate disk-shaped insulating layers having a second radial extension that is less than the first radial extension; and
        a plurality of coaxially arranged connection conductors that are electrically insulated from one another by the plurality of insulating layers and are carried by the carrier element,
    wherein the plurality of coaxially arranged connection conductors have coil connection areas for the coil ends and power connection area for a power supply of the electric machine,
    wherein the carrier element is formed by one of the plurality of coaxially arranged connection conductors and/or by one of the plurality of separate disk-shaped insulating layers, and
    wherein a remainder of the plurality of coaxially arranged connection conductors and/or a remainder of the plurality of insulating layers are fixed to the carrier element,
    wherein the connection conductors and the insulating layers are annular disk shaped and are arranged so as to be axially staggered at the stator, and
    wherein the winding body has a winding area formed by a winding carrier and by two legs that limit the winding area in axial direction and are connected to the winding carrier, wherein the connection conductors are arranged axially with respect to the winding area or radially with respect to the winding area.

2. The stator according to claim 1, wherein a respective insulating layer located between two connection conductors serves as the carrier element of the interconnection device.

3. The stator according to claim 1, wherein the carrier element is fixed to the winding bodies or to a stator carrier or to an element that is fixedly connected to the stator carrier.

4. The stator according to claim 1, wherein the interconnection device is arranged axially adjacent to the winding area of the stator coils.

5. The stator according to claim 1, wherein the carrier element is fixed to at least one of the legs.

6. The stator according to claim 1, wherein the coil ends are guided radially out of the winding bodies and are arranged axially directly adjacent to respective coil connection areas.

7. The stator according to claim 1, wherein the coil ends are located on a same axial side as the winding areas with reference to coil connection areas.

8. Electric machine with a rotor and with a stator, wherein the stator comprises:
    a quantity of stator coils with coil ends;
    winding bodies
    an annular stator lamination stack at which the quantity of stator coils is arranged by the winding bodies; and
    an interconnection device for the stator coils arranged at the stator lamination stack on a front side, wherein the interconnection device is fixed to the winding bodies of the stator coils by a carrier element of the interconnection device, the interconnection device comprises:
        the carrier element having a first radial extension;
        a plurality of separate disk-shaped insulating layers having a second radial extension that is less than the first radial extension; and
        a plurality of coaxially arranged connection conductors that are electrically insulated from one another by the plurality of insulating layers and are carried by the carrier element,
    wherein the plurality of coaxially arranged connection conductors have coil connection areas for the coil ends and power connection area for a power supply of the electric machine,
    wherein the carrier element is formed by one of the plurality of coaxially arranged connection conductors and/or by one of the plurality of separate disk-shaped insulating layers, and
    wherein a remainder of the plurality of coaxially arranged connection conductors and/or a remainder of the plurality of insulating layers are fixed to the carrier element,
    wherein the connection conductors and the insulating layers are annular disk shaped and are arranged so as to be axially staggered at the stator, and
    wherein the winding body has a winding area formed by a winding carrier and by two legs that limit the winding area in axial direction and are connected to the winding carrier, wherein the connection conductors are arranged axially with respect to the winding area or radially with respect to the winding area.

* * * * *